United States Patent
Lombardi et al.

(10) Patent No.: US 9,844,117 B2
(45) Date of Patent: Dec. 12, 2017

(54) APPARATUS AND METHOD FOR LED RUNNING LIGHT CONTROL AND STATUS

(71) Applicant: Microchip Technology Incorporated, Chandler, AZ (US)

(72) Inventors: Carlo Lombardi, Buttigliera Alta (IT); Andreas Reiter, Feldkirchen-Westerham (DE); Franz Thalheimer, Moembris (DE); Frank Ziegenhorn, Hoehenkirchen-Siegertsbrunn (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 11 days.

(21) Appl. No.: 14/837,470

(22) Filed: Aug. 27, 2015

(65) Prior Publication Data

US 2016/0066372 A1 Mar. 3, 2016

Related U.S. Application Data

(60) Provisional application No. 62/043,221, filed on Aug. 28, 2014.

(51) Int. Cl.
*H05B 33/08* (2006.01)
*B60Q 1/00* (2006.01)
*B60Q 1/34* (2006.01)

(52) U.S. Cl.
CPC ......... *H05B 33/089* (2013.01); *B60Q 1/0088* (2013.01); *B60Q 1/34* (2013.01); *H05B 33/083* (2013.01)

(58) Field of Classification Search
None
See application file for complete search history.

(56) References Cited

U.S. PATENT DOCUMENTS

| | | | | |
|---|---|---|---|---|
| 9,313,848 | B2 * | 4/2016 | Creusen | H05B 33/0809 |
| 2002/0053878 | A1 * | 5/2002 | Masaki | B60Q 1/26 315/82 |
| 2009/0284178 | A1 * | 11/2009 | Jessenig | H02M 3/156 315/297 |
| 2010/0109557 | A1 * | 5/2010 | Bouchard | H05B 33/0818 315/294 |

(Continued)

FOREIGN PATENT DOCUMENTS

WO 2013/090945 A1 6/2013 ............. H05B 33/08

OTHER PUBLICATIONS

International Search Report and Written Opinion, Application No. PCT/US2015/047367, 15 pages, dated Apr. 14, 2016.

*Primary Examiner* — Dedei K Hammond
(74) *Attorney, Agent, or Firm* — Slayden Grubert Beard PLLC

(57) ABSTRACT

A light emitting diode (LED) running light comprises a current sink and a plurality of series coupled LED block cells; each of the plurality of LED block cells comprising a LED and a bypass circuit to the current sink, wherein each series coupled LED sequentially turns on (lights) when a voltage source increases by additive voltage increments of at least the turn-on voltage of each LED in the series coupled string until all LEDs are on (lit). The current sink maintains a desired current value through the LEDs and may also be used to provide waveforms for diagnostic and timing purposes.

23 Claims, 13 Drawing Sheets

(56) References Cited

U.S. PATENT DOCUMENTS

| | | | | |
|---|---|---|---|---|
| 2013/0278151 A1* | 10/2013 | Lear | ............... | H05B 33/0839 |
| | | | | 315/164 |
| 2014/0015425 A1* | 1/2014 | Kraft | ............... | H05B 33/0836 |
| | | | | 315/185 R |
| 2014/0139125 A1* | 5/2014 | Lee | ............... | H05B 33/0824 |
| | | | | 315/186 |

* cited by examiner

Figure 2 (Prior Technology)

Figure 3 (Prior Technology)

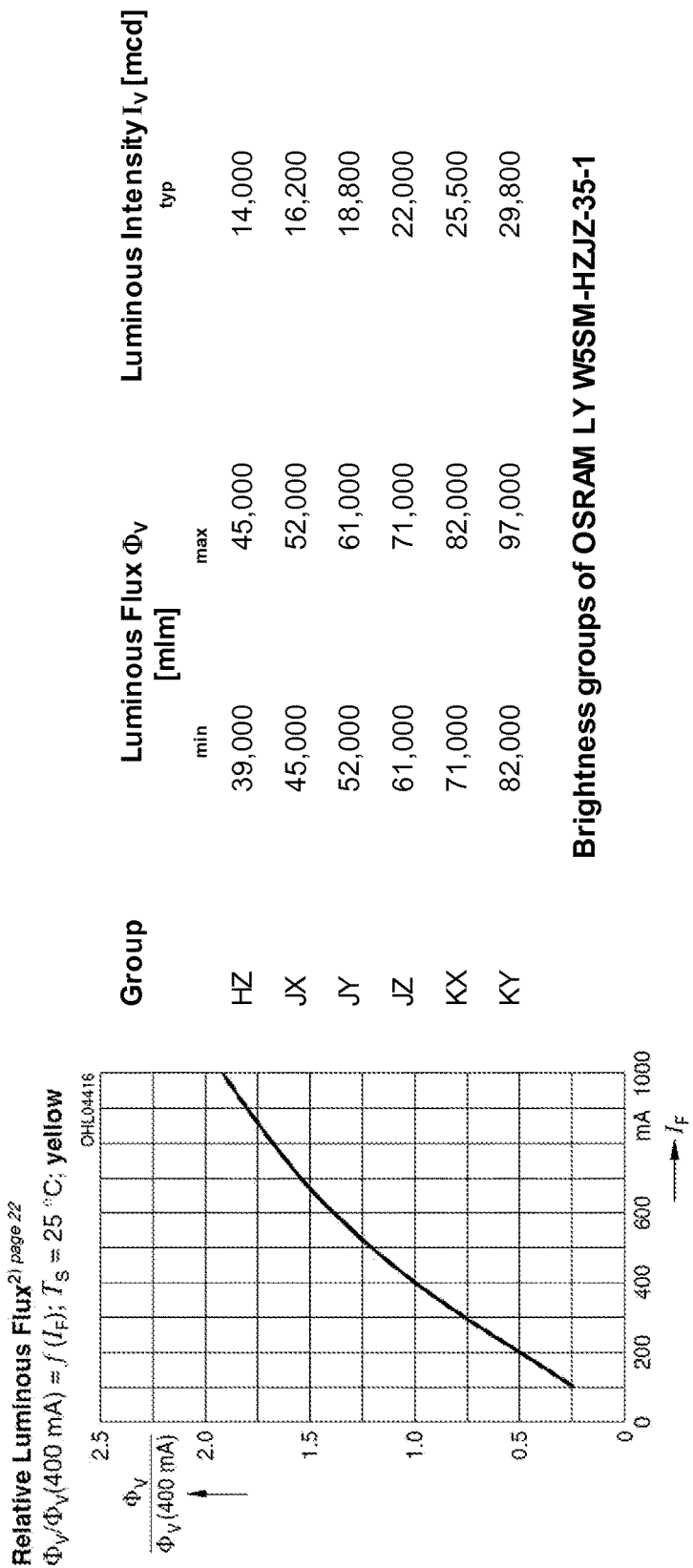
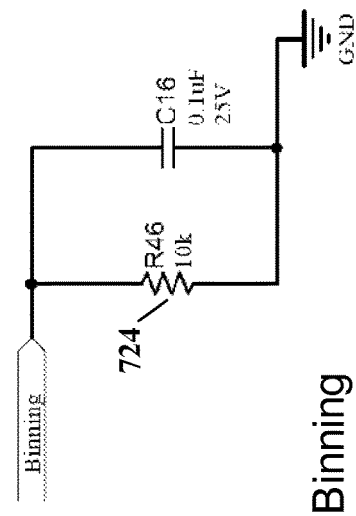
Figure 8

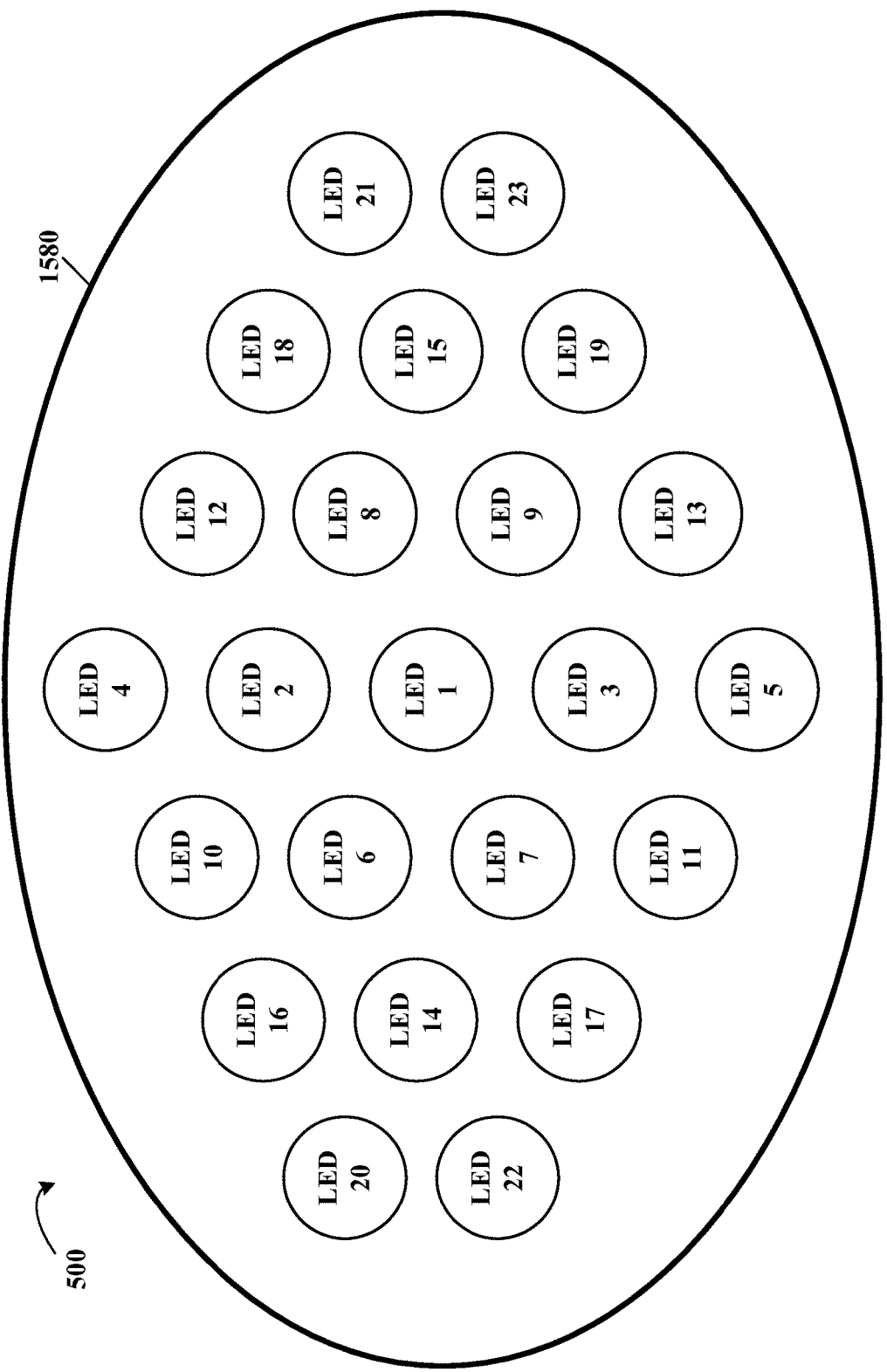

APPARATUS AND METHOD FOR LED RUNNING LIGHT CONTROL AND STATUS

RELATED PATENT APPLICATION

This application claims priority to commonly owned U.S. Provisional Patent Application Ser. No. 62/043,221, filed Aug. 28, 2014; which is hereby incorporated by reference herein for all purposes.

TECHNICAL FIELD

The present disclosure relates to driver circuits for light emitting diodes (LEDs), and, in particular, to a control concept for automotive LED running light turn indicator units.

BACKGROUND

Automotive running LED turn signals are becoming popular because they enhance the visual perception of this safety critical signal. The LED turn signal technology has recently been introduced starting in the later part of 2013 on different car models by various manufactures throughout the world.

SUMMARY

Therefore a need exists for lower cost and simplified installation automotive LED running light turn signal indicator units.

According to an embodiment, a light emitting diode (LED) running light may comprise: a plurality of series coupled LED block cells; each of the plurality of LED block cells may comprise a LED; and a bypass circuit coupled between a cathode of the LED and a current sink, wherein the bypass circuit decouples the cathode of the LED from the current sink when a voltage at an anode of the LED may be greater than a certain voltage value.

According to a further embodiment, an anode of a first LED may be connected to a voltage source and a cathode of a last LED of the plurality of series coupled LED block cells may be connected to the current sink. According to a further embodiment, the current sink may be an adjustable current sink having a voltage reference input to determine a sink current. According to a further embodiment, the certain voltage value may be determined by a zener diode breakdown voltage.

According to a further embodiment, the bypass circuit may comprise: a first transistor coupled between the cathode of the LED and the current sink; a zener diode coupled between the anode of the LED and one end of a first resistor having another end thereof coupled to a power supply common; and a second transistor having an input coupled to a junction of the zener diode and the first resistor, and an output coupled to an input of the first transistor, wherein a voltage across the first resistor turns on the second transistor which then turns off the first transistor, thereby decoupling the cathode of the LED from the current sink.

According to a further embodiment, the first and second transistors may be selected from the group consisting of bipolar junction transistor (BJT) and field effect transistor (FET). According to a further embodiment, the current sink may be a constant current sink. According to a further embodiment, a binning circuit may be configured to provide a value for the current sink to produce a certain total brightness of the LEDs in each of the plurality of LED block cells. According to a further embodiment, a controllable output voltage source having an output voltage may be coupled to the plurality of series coupled LED block cells. According to a further embodiment, the output voltage from the controllable output voltage source may be adjusted by varying a reference voltage to an error amplifier of an analog feedback loop in the controllable output voltage source. According to a further embodiment, the output voltage from the controllable output voltage source may be adjusted by programming desired values into a digital compensator of a switched-mode power supply used for the controllable output voltage source.

According to a further embodiment, a microcontroller may be coupled to the current sink and the controllable output voltage source, wherein the microcontroller controls the output voltage from the controllable output voltage source, provides the voltage reference input to the current sink, and measures LED current from the current sink.

According to a further embodiment, the current sink may comprise a transistor, wherein a reference voltage control current through the transistor. According to a further embodiment, the transistor may be selected from the group consisting of a bipolar junction transistor (BJT) and a field effect transistor (FET). According to a further embodiment, the LED running light may provide a turn signal indicator. According to a further embodiment, the turn signal indicator may comprise a plurality of linearly arranged LED light bars. According to a further embodiment, the turn signal indicator may comprise a plurality of LEDs behind an optical diffusion lens.

According to another embodiment, a method for sequentially controlling a light emitting diode (LED) running light may comprise the steps of: coupling a plurality of LED block cells in series; applying an adjustable voltage to a first node of a first one of the plurality of LED block cells; and decoupling second nodes of LEDs in respective LED block cells from a current sink when the adjustable voltage may be above certain respective voltage values.

According to a further embodiment of the method, may comprise the steps of: detecting negative transitioning edges of a waveform from the current sink connected to the plurality of LED block cells; and using the detected negative transitioning edges for an interval trigger of a timing control loop.

According to yet another embodiment, a method for diagnosing problems in a light emitting diode (LED) running light may comprise the steps of: counting a number of negative transitioning edges of a waveform from a current sink connected to a series coupled plurality of LEDs; and comparing the number of negative transitioning edges with an expected number, wherein if the counted number may be equal to the expected number then all LEDs may be operating, and if the counted number may be less than the expected number then at least one LED may be shorted.

According to a further embodiment of the method, may comprise the step of measuring a voltage offset level of a control feedback waveform from a control pedestal of a fault state signal waveform to determine a number of non-working LEDs. According to a further embodiment of the method, may comprise the step of measuring a ramp offset level of a control feedback waveform from a fault state signal waveform to determine a location of a non-working LED.

BRIEF DESCRIPTION OF THE DRAWINGS

A more complete understanding of the present disclosure may be acquired by referring to the following description taken in conjunction with the accompanying drawings wherein:

FIG. 8 illustrates a schematic diagram, graph and a chart for luminous flux of a plurality of different batch LEDs, according the teachings and specific example embodiments of this disclosure;

FIG. 15 illustrates a schematic elevational view of a LED running signal light, according to another specific example embodiment of this disclosure.

Figure 1:
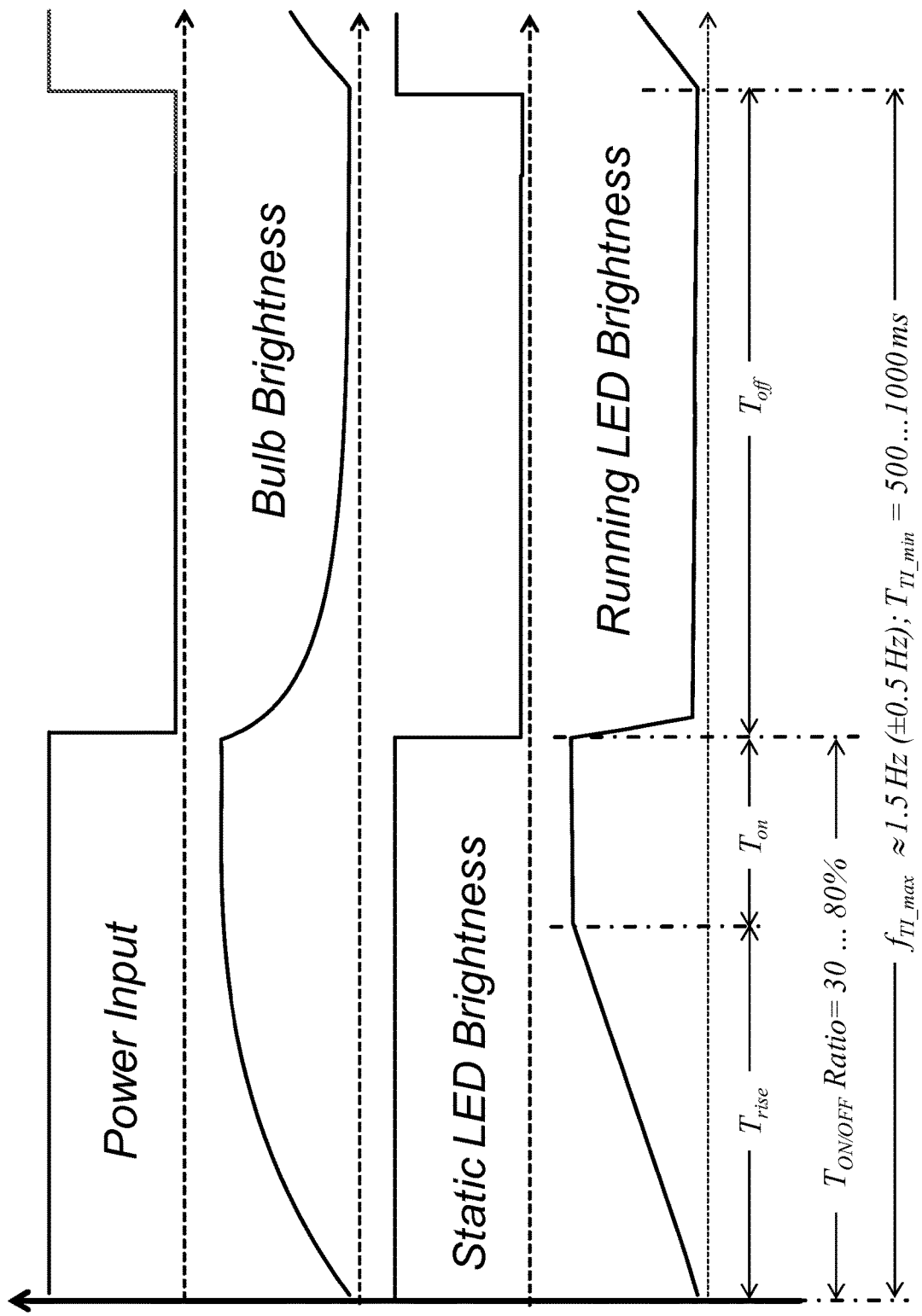
FIG. 1 illustrates schematic graphs of the brightness behavior of conventional incandescent light bulbs (lamps), and static and running LEDs, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

According to various embodiment of this disclosure, a light emitting diode (LED) running light may comprise a current sink and a plurality of series coupled LED block cells; each of the plurality of LED block cells comprising a LED and a bypass circuit to the current sink, wherein each series coupled LED sequentially turns on (lights) when a voltage source increases by additive voltage increments of at least the turn-on voltage of each LED in the series coupled string until all LEDs are on (lit). The current sink maintains a desired current value through the LEDs and may also be used to provide waveforms for diagnostic and timing purposes.

Sophisticated LED (light emitting diode) lighting patterns and/or changes in perceived light brightness may be provided by LED drivers integrated on a LED running light board that is part of a turn signal assembly. However in tail lights having slim designs there may be no room for complex LED drivers. Therefore, LED driver boards may have to be separate from the LED running light board. According to various embodiments, the LED control interface and control signal generation can be significantly simplified while providing a high degree of robustness and diagnosticability required for safety critical applications, e.g., automotive turn signals, in a very cost effective way. According to various embodiments, by providing a self-driven circuit associated with each LED in a string of LEDs, and using a voltage ramp applied to the string of series connected LEDs will result in a turn-on sequence across that string of LEDs.

A "LED running light" as used herein may be defined as a plurality of LEDs that may be sequentially turned on to provide an increasing in length bar (line) of light or an increasing light intensity from a lamp lens. The LED running light, when activated, effectively grabs the attention of other automobile drivers in visual range of the activated LED running light.

The turn signal is a safety critical system and is an important subject in legal disputes after an accident occurs. Therefore, extensive diagnostics are mandatory and robustness, reliability and long life-time are major design goals. Specific example embodiments of this disclosure provide a reduction in complexity and cost of a LED running light assembly over present technology LED running light assemblies. Less on-board components and simplified interfaces are very beneficial in slim tail-light applications. An auto-adapting variable-voltage source, and intelligent and synchronous monitoring/diagnostics capabilities may be provided, according to specific example embodiments of this disclosure.

Referring now to the drawings, the details of example embodiments are schematically illustrated. Like elements in the drawings will be represented by like numbers, and similar elements will be represented by like numbers with a different lower case letter suffix.

Referring to FIG. 1, depicted are schematic graphs of the brightness behavior of conventional incandescent light bulbs (lamps), and static and running LEDs, according to the teachings of this disclosure. FIG. 1 shows graphical comparisons of conventional incandescent light bulb (lamp), conventional LED light and LED running light behaviors. Conventional incandescent bulb turn signals may "glow" up and down over some 100 milliseconds. This "turn on/off" event of an incandescent lamp turn signal can therefore hardly be missed. The incandescent lamp reaches its nominal brightness for only a very short period of time and is not as dominant as the brightness of LEDs, however, change of brightness rises attention even if the effective "turn-on event" of the incandescent lamp has been missed.

Contrary to incandescent light bulbs, LED turn indicator signal lamps turn on and off within microseconds. If the LED turn on/off event has been missed, the LED brightness is static to the eye. The LED is bright and clearly visible when looked at directly, however, it may not raise sufficient attention when appearing at the periphery of the eyes of a driver. To increase the noticeability of a LED turning on, e.g., turn signal, more like an incandescent lamp, an increasingly bright light intensity (lumen) output may be provided with a LED running light. The LED running light will increase its light intensity over time, $T_{rise}$, until reaching its maximum brightness that may be maintained for a certain time, $T_{on}$. In this way a LED running light may more closely match the noticeability of an incandescent lamp. Hence, a LED running light turn signal combines advantages of both the incandescent light and LED technologies to gain maximum safety by being more easily noticed by a driver in another automobile.

Figure 2:
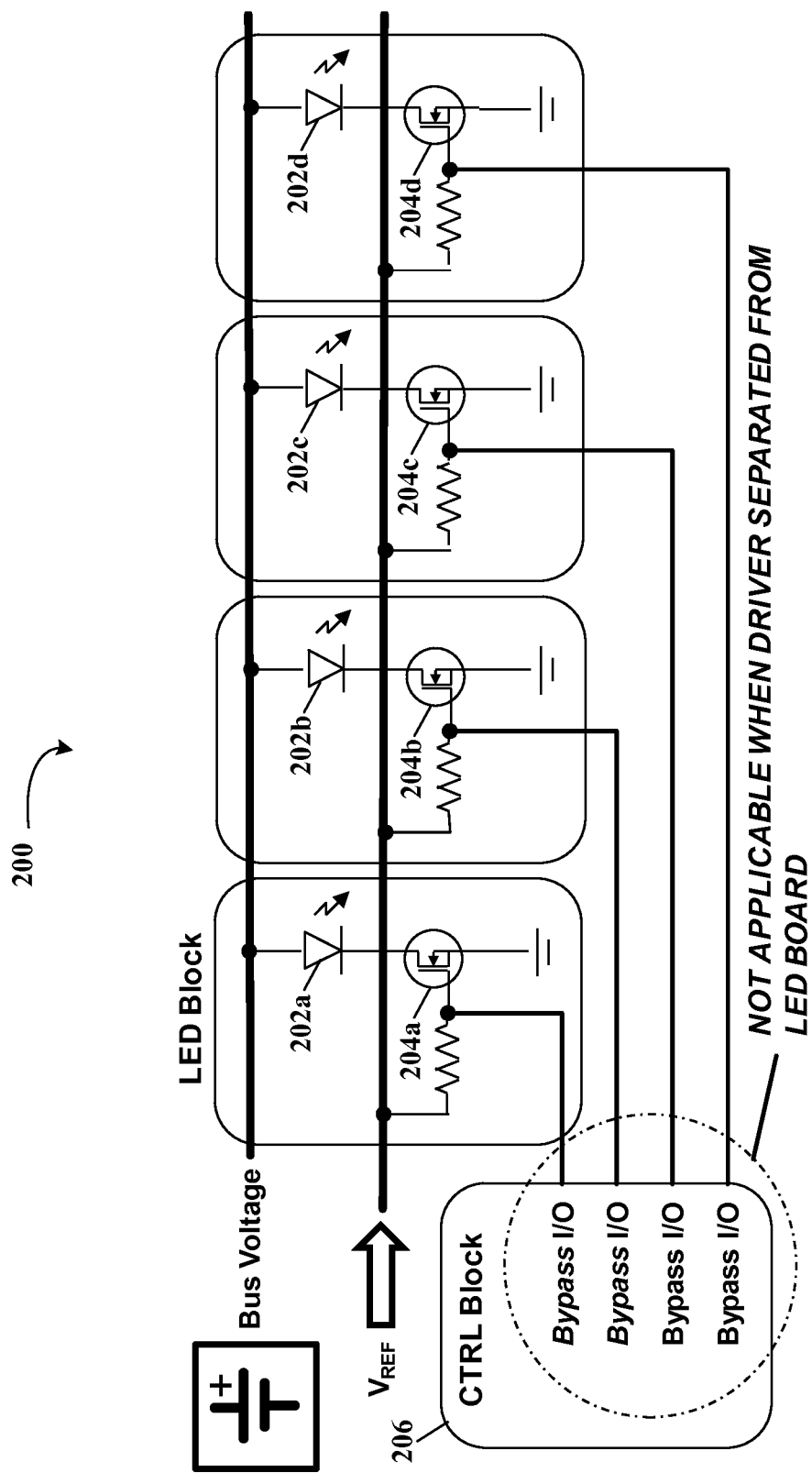
FIG. 2 illustrates a schematic diagram of a parallel configured LED array for running lights, according to prior technology.

Referring to FIG. 2, depicted is a schematic diagram of a parallel configured LED array for running lights, according to prior technology. FIG. 2 shows a parallel LED array, generally represented by the numeral 200, used in a conventional running light system. A power source is coupled to the anode of each LED 202 and transistor switches 204 are coupled between the LED 202 cathodes and power supply common (e.g., ground). The transistor switches 204 also provide for current limiting through each respectively connected LED 202. $V_{REF}$ sets the amount of current through each LED 202. The Bypass I/O control block 206 selectively enables and disables each one of the transistor switches 204. When a transistor switch 204 is enabled it will allow the cathode of the respectively connected LED 202 to be coupled to the power supply common at a fixed current value determined by $V_{REF}$. When a transistor switch 204 is disabled no current flow can occur through the LED 202, effectively turning off the LED 202 connected thereto (no light therefrom).

Advantages of this parallel LED array 200 arrangement are a simple driver topology used as a voltage source (buck converter only) and a very flexible way to implement multiple light patterns. Challenges are a high number of control lines require that either microprocessor placement be on the LED board (not shown) or a higher number of wires and large connectors. Furthermore, there is challenging current control and individual control staging for each LED 202 as well as handling of high currents on the power supply lines due to the parallel configuration of the LEDs 202. LED turn signal running lights typically use one control line for each of the LEDs 202 comprising the running light turn signals. Therefore parallel controlled running LED turn signals require a plurality of control connections thereto that increase assembly complexity and manufacturing costs.

Figure 3:
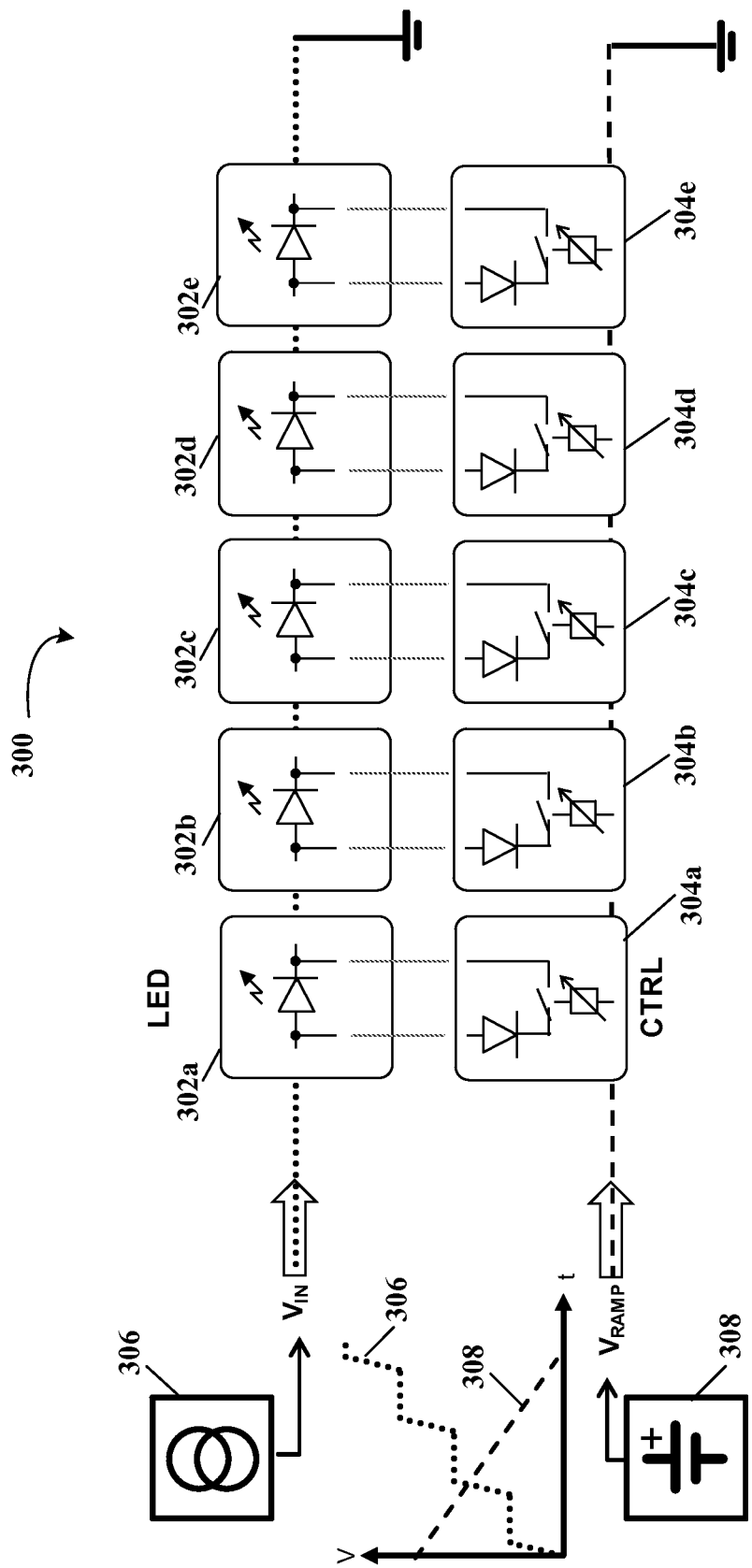
FIG. 3 illustrates a schematic diagram of a series configured LED array for running lights, according to prior technology.

Referring to FIG. 3, depicted is a schematic diagram of a series configured LED array for running lights, according to prior technology. FIG. 3 shows a conventional running light system with the advantage of simple control of the LEDs 302 and balancing of currents therethrough. This series configured LED running light array, generally represented by the numeral 300, works with common analog current sources 306, and has the possibility of adaptive timing, using a 3-wire interface, and LED diagnostics. However, this series connected LED running light array 300 requires a high control voltage, $V_{RAMP}$, from a voltage ramp generator 308 that must increase in start-up voltage value as the number of active LEDs 302 increase. The output voltage of the current source 306 cannot be used as a bias reference as its start-up voltage will be low at the beginning and high at the end, when all LEDs lit up, while the output of the control signal source 308 will be high at start-up and low when the sweep across the string has completed. Therefore a second buck/boost converter must be used as the voltage ramp generator 308 which can be a design challenge and adds cost and complexity.

The series connected LED running light array 300 operates as follows: When the control voltage 308, $V_{RAMP}$, is at maximum all of the switches of the control 304 are closed and all LEDs 302 are bypassed. The control switches in the control 304 each have a different voltage that will close them. The left most control switch would have the highest close voltage and the right most control switch would have the lowest close voltage. When the control voltage is lower than the close voltage of the control switch it will open, thereby disconnecting the bypass diode from its parallel connection with the LED 302. When the bypass diode is connected in parallel with the LED 302 (control switch closed) current will flow through the bypass diode and not the LED 302 since the bypass diode in the control 304 is selected to have a lower conduction voltage, $V_{forward}$, than the LED 302. As each of the LED bypass auxiliary circuits require different voltage levels for opening and closing the bypass, each of the LED blocks have to be configured individually in accordance with their position within the string, which increases design and production complexity.

Figure 4:
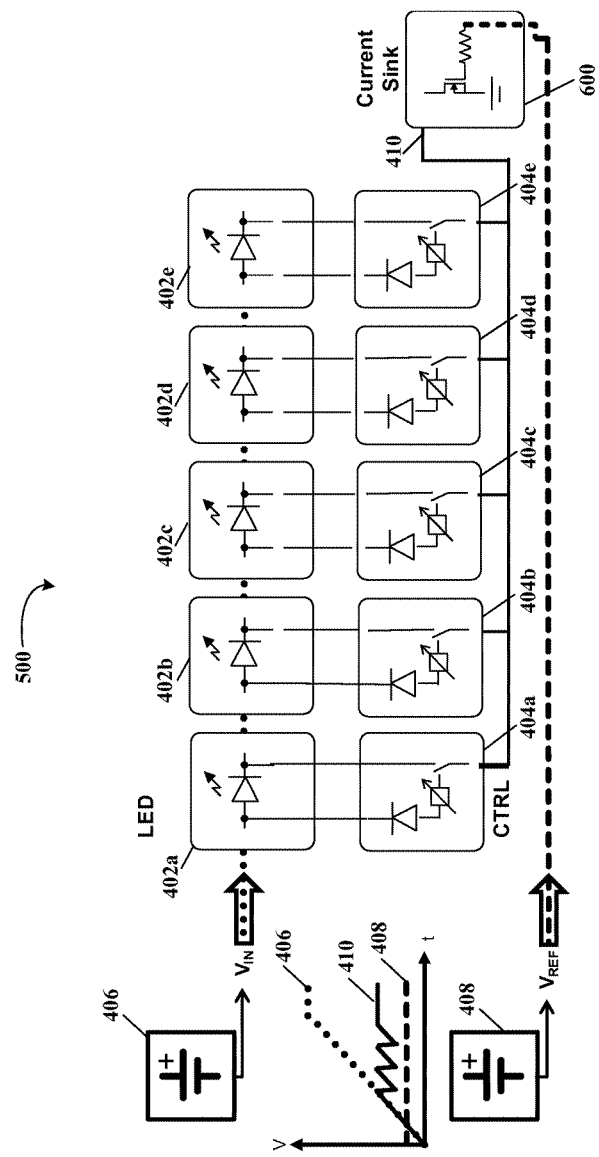
FIG. 4 illustrates a schematic diagram of a serial/parallel configured LED array for running lights, according to specific example embodiments of this disclosure.
Figure 5:
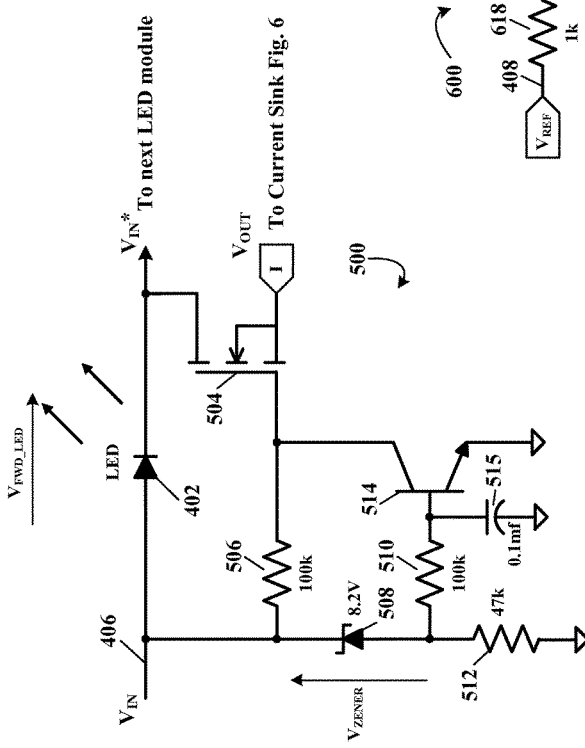
FIG. 5 illustrates a schematic diagram of a single LED block cell, according to specific example embodiments of this disclosure.

Referring to FIG. 4, depicted is a schematic diagram of a serial/parallel configured LED array for running lights, according to specific example embodiments of this disclosure. FIG. 4 shows a block diagram of a serial/parallel LED array providing optimized self-driven running lights and control thereof. The advantages of this circuit are: Only one controllable voltage source 406 is required. Only a static, low-voltage reference signal 408, $V_{REF}$, is required for setting the current through the LEDs 402. Each LED bock consists of an identical auxiliary circuit with identical components whereby the relative location of each block within the entire string becomes irrelevant. This system provides for independent, adjustable current control, adaptive timing, easy to implement diagnostics, and only one controllable voltage source 406. A simple 3-wire interface including diagnostics may be used Referring to FIG. 5, depicted is a schematic diagram of a single LED block cell, according to specific example embodiments of this disclosure. FIG. 5 shows a schematic diagram detail of a single controllable LED block cell, generally represented by the numeral 500, and used for the plurality of LED block cells 500 in the circuit arrangement of FIG. 4. The LED block cell 500 may comprise a self-driven electronic circuit associated with each LED 402. LED 402 represents a LED assembly of at least one or more serial connected LEDs, The self-driven electronic circuit may comprise a Zener diode 508, N-channel type gate drive transistor 514, N-channel type bypass transistor 504, LED bypass resistor 506, current limiting resistors 510 and 512 and the filter capacitor 515. Different voltage and power levels may require differing component values or additional filtering capacitors. In an unpowered state, Zener diode 508 will neither be reverse-biased nor conducting and so all remaining voltages within the circuit will be floating. When the voltage source 406 starts to rise from zero, a voltage $V_{GATE}$ will start to build up at the gate/base of transistor 504 through bypass resistor 506. When the gate/base threshold voltage of transistor 504 is exceeded, it will start conducting, allowing the current flow through LED 402 onto the input of the current sink 600, and thereby simultaneously bypassing the downstream LEDs 402. Once the input voltage to the circuit, $V_{IN}$, exceeds the forward voltage of the LED 402 $V_{FWD\_LED}$ and the voltage drop across the current sink 600 $V_{SINK}$, the LED will start conducting and emit light. The minimum available gate/base threshold voltage of transistor 504 will be determined by the forward voltage $V_{FWD\_LED}$ of the LED type used and might vary. Thus the type of the switch might be a bipolar junction transistor (BJT) or a MOSFET with or without logic level gate voltage thresholds.

Once the breakdown voltage of the Zener diode $V_{ZENER}$ is exceeded it will start to conduct against the power supply common (e.g. ground) and current will flow through the current limiting resistor 512. For proper function the minimum breakdown voltage of the Zener diode is $V_{ZENER} > V_{FWD\_LED} + V_{SINK}$. As a result the voltage across the resistor 512 will start to build up at the base of transistor 514 ($V_{BE}$) until its base-emitter voltage is exceeded and the gate drive transistor 514 will start conducting pulling down the gate of bypassing transistor 504. Resistor 510 will limit the base current as voltage continues to increase. When the gate drive transistor 514 is fully conducting, the gate/base of bypassing transistor 504 will be pulled to power supply common (e.g., ground) and the transistor 504 will turn off. At this moment the output voltage of the circuit $V_{IN}^*$ (cathode side of the LED 402a) will be applied to the following LED block b, wherein $V_{IN}^* = V_{IN} - V_{FWD\_LED}$. The steadily increasing power supply voltage 406 will then close the next bypassing transistor 504b through bypass resistor 506b, now connecting two LEDs (402a and 402b) to the current source 600 until both are fully conducting in a string configuration while the rest of the downstream LEDs 402 are still bypassed. When the output voltage $V_{IN}^*$ of block a exceeds the breakdown voltage wherein $V_{ZENER}$ of Zener diode 508b, gate drive transistor 514b will couple the gate of bypassing transistor 504b to ground and $V_{IN}^*$ of LED block b will be applied to LED block c.

This continues for the remaining downstream LEDs 402 until a voltage control pedestal (FIG. 11) is reached wherein all gate drive switches 514 are closed, all bypass switches 504 in the control circuits 404 are open and all of the series connected LEDs 402 are conducting current in a string configuration to the current sink 600. Thus by adjust up the voltage from the voltage source 406, the LEDs 402 may be sequentially lit, and the lumen brightness therefrom increased accordingly.

Figure 6:
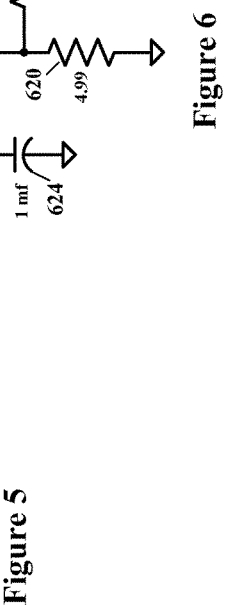
FIG. 6 illustrates a schematic diagram of a linear current sink, according specific example embodiments of this disclosure.

Referring to FIG. 6, depicted is a schematic diagram of a linear current sink, according specific example embodiments of this disclosure. As shown in FIG. 6, the series connected LED 402 forward current may be controlled to a desired current value by connecting the output, $V_{OUT}$, of the active (conducting—lighted) string portion of the LED block cells 500 to a linear current regulator, generally represented by the numeral 600. The linear current regulator 600 may be controlled by a reference input $V_{REF}$ and provide a LED forward current feedback signal, $I_{LED}$, that may be used to implement closed loop current adjustment control.

Closed loop current adjustment is necessary to support LED binning. During production, LEDs will vary in color, flux and forward voltage and this is also true for products from the same batch. The differences are significant and therefore LEDs are measured and delivered to the market in subclasses or groups called BINs (Brightness Index Number) and this process of segregating LEDs is called binning. So a particular bin may contain LEDs, which emit light within a range of wavelengths, range of flux values and also the range of forward voltage that can be applied safely to the LEDs. For instance a bin might only contain LEDs having Max–Min dominant wavelength in the range of 587-584.5 nm (e.g., a range of 2.5 nm, thereby guaranteeing color consistency) and LEDs emitting flux in the range of 6.3-8.2 lm (thereby ensuring that LEDs in the bin have similar brightness).

The linear current regulator 600 may also automatically compensate for changes in forward voltage across the full operating temperature range of the LEDs 402 by regulating on constant current only. The input voltage ramp does not have to be modified during operation. It should be noted that to simplify the control interface to a self-driven LED assembly, the linear current regulator 600 can be moved over to the voltage driver module for a savings of up to two wires and associated connector space according to some embodiments. This will help to save costs in manufacturing the LED running light assembly when binning and detailed diagnostics are required.

Figure 7:
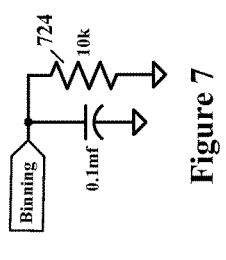
FIG. 7 illustrates a schematic diagram of a binning circuit, according to specific example embodiments of this disclosure.

Referring to FIGS. 7 and 8, depicted is a schematic diagram of a binning circuit, according to specific example embodiments of this disclosure. As shown in FIG. 7, a circuit for binning is necessary in many LED drivers to properly adjust the total brightness of the LEDs in accordance with the current ratings across all binning classes given in the LED data specification sheets. FIG. 8 repeats the schematic diagram of FIG. 7, and a graph and chart for luminous flux of a plurality of different batch LEDs, according the teachings and a specific example embodiment of this disclosure.

The selected binning-resistor 724, corresponding to the LED batch used, may be read by the LED running light driver which may then adjust the LED 402 forward current to a desired total light output (brightness). Based on the chart for relative luminous flux, a closed loop current adjustment can be used to automatically adapt to certain LED types. The LED current adjustment versus brightness is highly application dependent and might change during production when LED types are discontinued or have to be replaced for other reasons. The bin class of the LED type used is usually encoded with proprietarily selected resistor values. One of the most common methods in measuring this resistance is to put a known reference resistor between some known supply voltage and the bin-resistor while the bin resistor is connected to ground. This assembly forms a voltage divider (FIG. 7). The divided voltage can be read using an analog-to-digital converter and the microcontroller can then refer to known values for the forward current with respect to the ADC reading. Analog constant current control circuits might use the bin resistor directly to adjust reference signals to the constant current control circuit to adjust the LED forward current in accordance with the LED data specification sheet.

As the auxiliary control circuit 500 can only perform a relatively simple, self-driven on/off function, the effective current regulation of the LED forward current of the active portion of the LED string is exclusively performed by current sink 600. The current sink may consist of a transistor which is used as a linear regulator by comparing the feedback voltage building up across shunt resistor 620 versus the reference voltage 408. The current regulation can be achieved by closing the control loop by an inverting error amplifier (operational amplifier), an integrated linear regulator circuit or by using an analog-to-digital converter and digital-to-analog converter of a microcontroller. Using a microcontroller might be required to solve design challenges during start-up, when there is no current flowing through the current sink 600 and therefore the current error will be at maximum. Using a purely analog feedback loop incorporating an inverting error amplifier will result in large current overshoots during start-up, as the operational amplifier would increase its output voltage to its maximum (not shown). These current overshoots may result in limited lifespan of the LEDs as well as flickering or color temperature distortions. A fully digital feedback loop or digitally controlled analog feedback loop, allowing turning on/off the error amplifier synchronously with the turn on/off events of the entire circuit, will prevent these overshoots and ensure reliable operation, maximum lifespan of the LEDs and most stable light output of the unit.

It is contemplated and within the scope of this disclosure that many other circuit designs and component values may be substituted and used for the circuits shown in FIGS. 5-7, and one having ordinary skill in electronic circuit design and the benefit of this disclosure may readily design such circuits. For example, transistors 504 and/or 514 may be either field effect transistors (FET) and/or bipolar junction transistors (BJT) with appropriate resistor values and circuit arrangements necessary for proper operation thereof.

Figure 9:
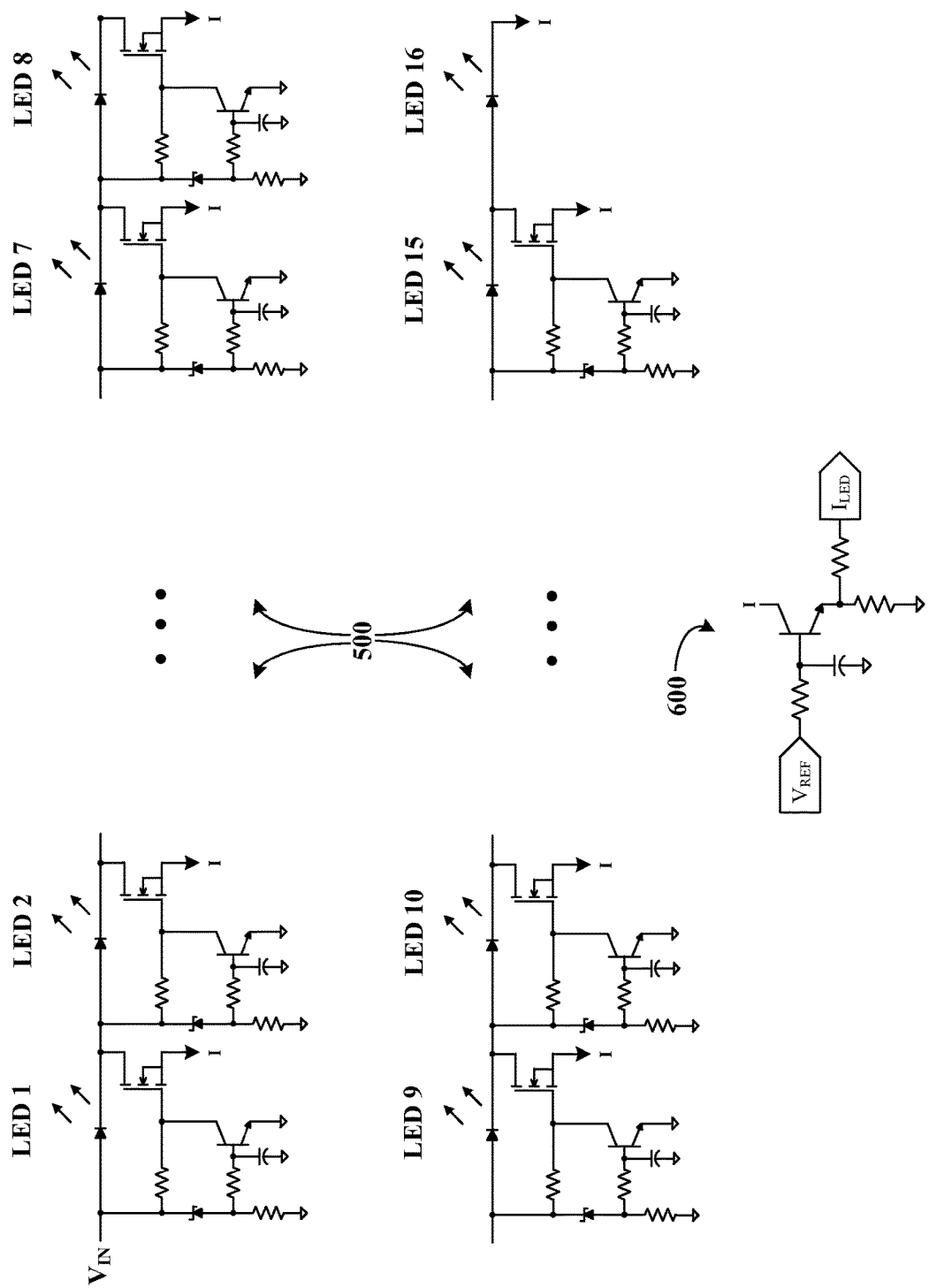
FIG. 9 illustrates a schematic diagram of a plurality of LED block cells and associated current sink arranged for running light applications, according to specific example embodiments of this disclosure.

Referring to FIG. 9, depicted is a schematic diagram of a plurality of LED block cells and associated current sink arranged for running light applications, according to specific example embodiments of this disclosure. FIG. 9 shows a more detailed circuit diagram of the embodiment shown in FIG. 4. According to an embodiment, the current sink 600 can be placed on the LED board assembly (not shown) but, in the alternative, can be moved to the LED driver (not shown) if needed to simplify the LED board interface, e.g., reduce number of connections/wires thereto. Sixteen LED block cells 500 are shown but it is contemplated and within the scope of this disclosure that more or fewer LED block cells 500 may be used according to specific embodiments of this disclosure.

Figure 10:
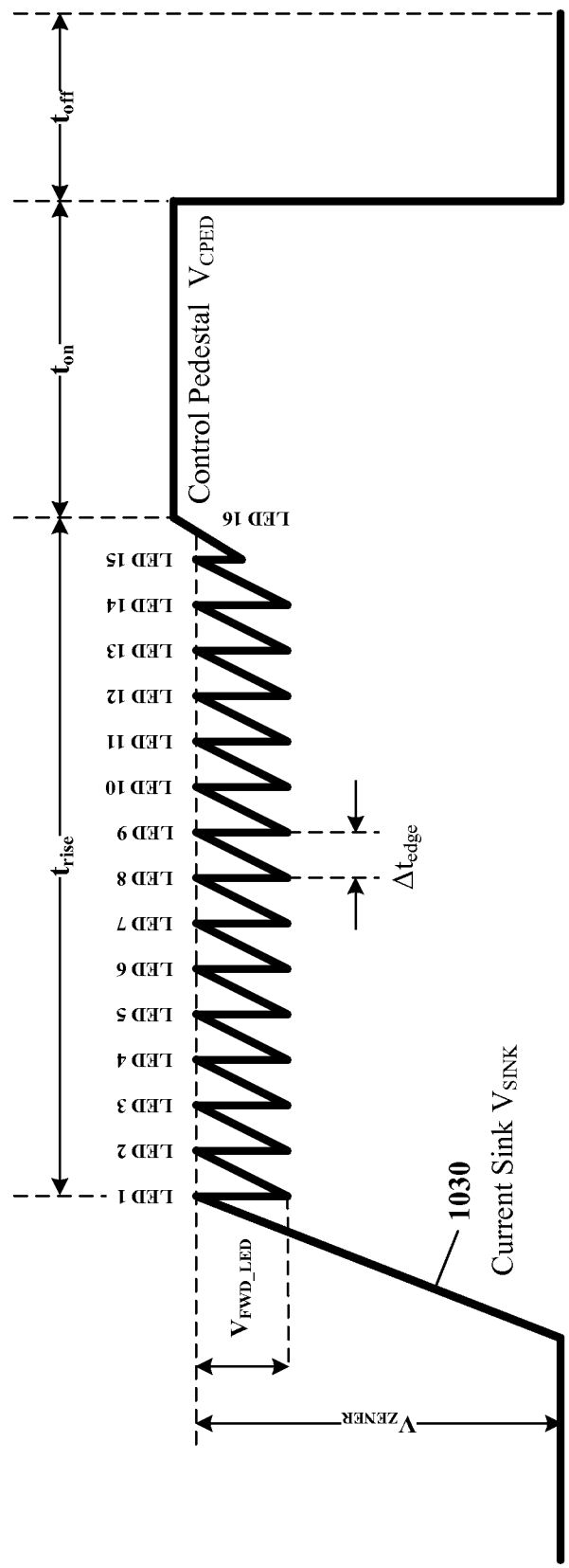
FIG. 10 illustrates a schematic graph of the forward voltage of a current sink that can be used to indicate a turn-on event for each functional LED, according to specific example embodiments of this disclosure.

Referring to FIG. 10, depicted is a schematic graph of the forward voltage of a current sink that can be used to indicate a turn-on event for each functional LED, according to specific example embodiments of this disclosure. Each vertical edge of the saw-tooth waveform shown in FIG. 10 represents the turn-on of one LED. For diagnostic purposes these vertical edges can be counted. For adaptive timing adjustment, these vertical edges may also be used as interval triggers with a timing loop. Using edge detection, the switch-over interval, $\Delta t_{edge}$, between two successive LEDs 402 may be measured and adjusted to achieve an appropriate on-time to create a continuous sweep meeting the overall timing requirements labeled as "Running LED Brightness" in the graphical timing diagram of this operation shown in FIG. 1. Timing adjustments between turn-on events (vertical edges) may be achieved by increasing the input voltage $V_{IN}$ 406 faster or slower. For automotive turn signals in particular, $V_{IN}$ ramp-up timings have to be adjustable to signal frequencies of at least one to two Hertz and on-times between 30% and 80% (FIG. 1).

Figure 11:
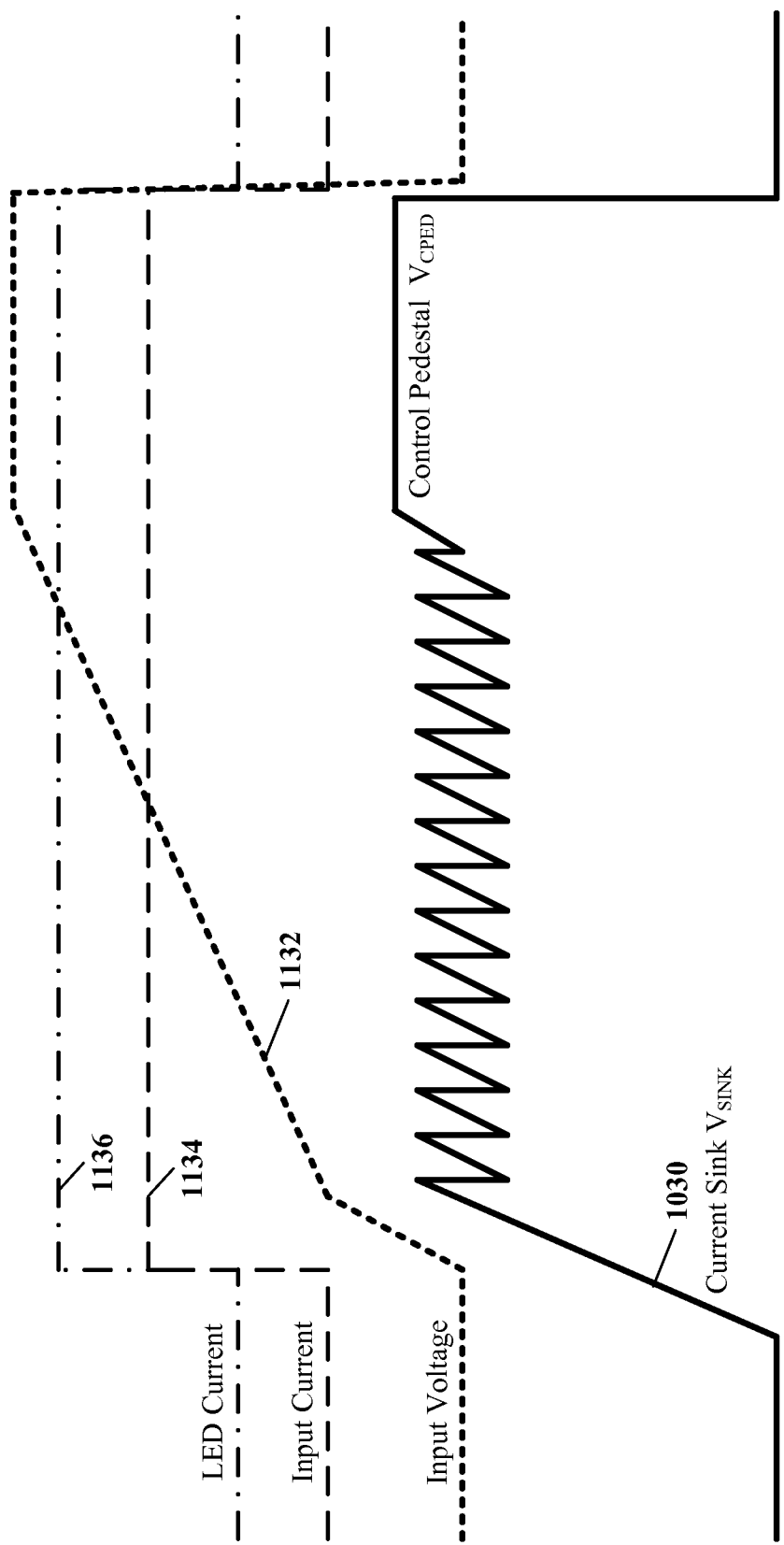
FIG. 11 illustrates schematic graphs of voltage and current waveforms for a string of sixteen LED blocks as shown in FIGS. 5 and 8, according to the teachings and specific example embodiments of this disclosure.

Referring to FIG. 11, depicted are schematic graphs of voltage and current waveforms for a string of sixteen LED blocks as shown in FIGS. 5 and 8, according to the teachings and specific example embodiments of this disclosure. The LED current 1136, input current 1134, input voltage 1132 and current sink voltage 1030 are shown with their baselines offset for better visual clarity. The voltage ramp 1132 is started with a fast soft-start ramp up to the turn-on threshold of the first LED. From this point on, the ramp might be increased with a constant $dV_{IN}/dt$ ratio but would also allow any other ramp forms to create any kind of sweep timing characteristic, including pulse steps from zero to the maximum input voltage $V_{IN}$ (common static flash signals or constant on status) or non-linear increments or decrements. With increasing input voltage $V_{IN}$ 406 the upstream portion of the LEDs 402 will sequentially light up according to the teachings and specific example embodiments of this disclosure. Every time one of the LED blocks 500 opens its bypass switch 504, the forward voltage drops by one LED forward voltage $V_{FWD\_LED}$, creating a vertical edge that eventually results in the full saw-tooth waveform shown in FIG. 10. After the last LED has turned on, the input voltage $V_{IN}$ may be further increased above the total forward voltage level of the sum of all LED 402 forward voltages $V_{FWD\_LED}$ and the current sink 600 forward voltage $V_{SINK}$. This ramp voltage overhead might be required to compensate for variations in total forward voltages over temperature, current rating and different LED types. This final voltage level $V_{CPED}$ (control pedestal) can be further used for enhanced diagnostics as shown in FIG. 11. During the entire sweep the LED forward current 1136 remains constant as it will be continuously adjusted by current sink 600. The input current 1134 may be constant or rise slightly over the sweep timing as the internal leakage currents within the driver circuit 500 might add up.

Figure 12:
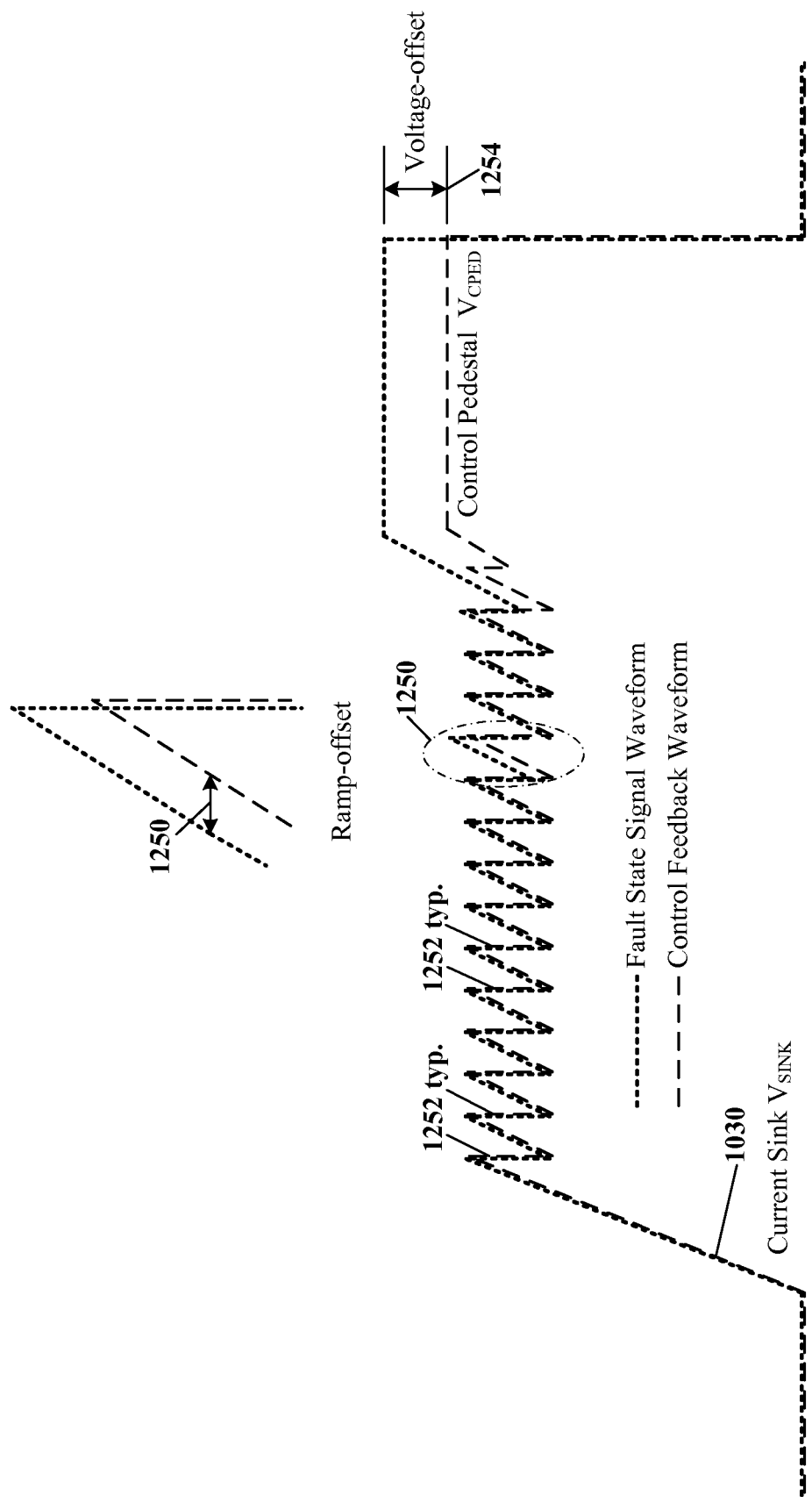
FIG. 12 illustrates schematic graphs of waveforms used for diagnostics of the string of sixteen LED blocks as shown in FIGS. 5 and 8, according to the teachings and specific example embodiments of this disclosure.

Referring to FIG. 12, depicted are schematic graphs of waveforms used for diagnostics of the string of sixteen LED blocks as shown in FIGS. 5 and 8, according to the teachings and specific example embodiments of this disclosure. Each edge 1252 indicates a turn-on event of one of the LEDs 402. For diagnostic purposes these edges may be counted. For adaptive timing adjustment, these edges can also be used as interval triggers for the timing control loop. LED faults may be detected on three levels: Missing edge(s) 1252 indicates that one or more LEDs in the running light string shorted. A voltage offset level 1254 from the control pedestal $V_{CPED}$ (see FIG. 10) indicates at least one or more LEDs in the running light string shorted. A broken LED 402 (open circuit condition) will prevent the self-driving circuit from functioning properly. An open LED 402 will cause the sweep across the LED 402 string to stop as the conduction path onto the current sink 600 is interrupted, which will be indicated by the feedback signal 1030 instantly dropping to zero. A shorted LED 402 will short the input voltage $V_{IN}$ of its LED block 500 to the following LED block 500, bypassing its attached LED control block 500. Instead of the shorted LED 402$n$, the following LED 402$n$+1 will turn on. The forward voltage of the shorted LED 402 is usually close to zero. So the total forward voltage across the LEDs 402 and the current sink 600 is reduced by one LED forward voltage $V_{FWD\_LED}$. This missing forward voltage component will add to the control pedestal $V_{CPED}$ and will become visible as an offset to the expected voltage level $V_{CPED}$. This voltage offset will be between zero (no fault) up to multiples of LED 402 forward voltages, $n \times V_{FWD\_LED}$, depending on the number of shorted LEDs. To properly detect offsets, the control pedestal $V_{CPED}$ has to be known and not affected by temperature or component dependent influences. Therefore the final input voltage $V_{IN}$ should be higher than the total forward voltage $V_{FWD\_LED} + V_{SINK}$. Thus the driver is even able to detect LED defects before a full short or open circuit condition occurs and the damaged LEDs may still be emitting light. During this phase LEDs 402 with reduced forward voltage $V_{FWD\_LED}$ will also generate some offset on the feedback signal 1030 saw-tooth peak 1250. For enhanced diagnostics this peak offset 1250 can be used to locate the damaged LED 402 within the total string.

Figure 13:
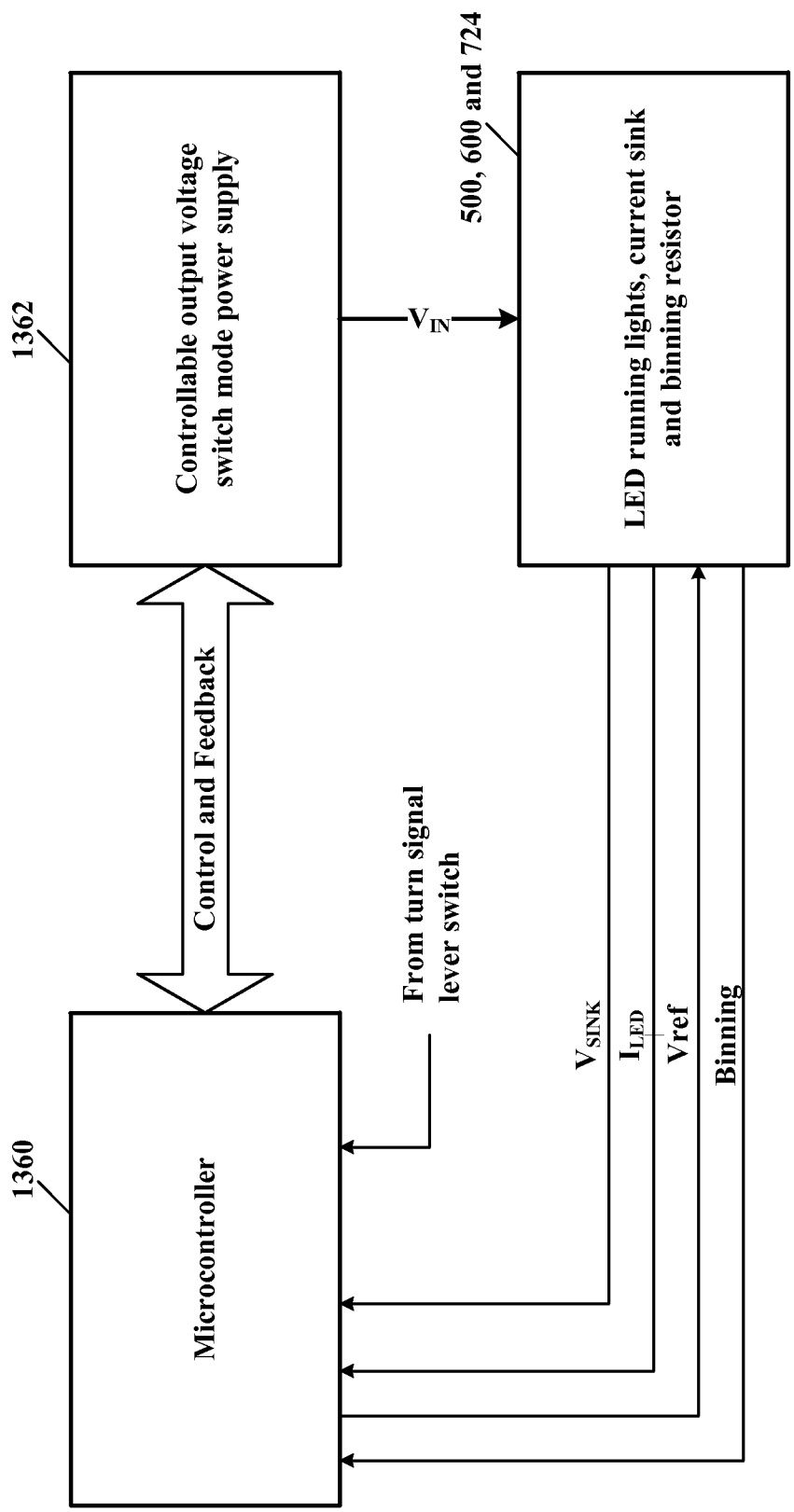
FIG. 13 illustrates a schematic system block diagram of a microcontroller, controllable output voltage switched-mode power supply and the LED running light module shown in FIGS. 5-7, according to specific example embodiments of this disclosure.

Referring to FIG. 13, depicted is a schematic system block diagram of a microcontroller 1360, controllable, variable output voltage switched-mode power supply 1362, which allows the generation of a freely programmable, controlled output voltage in a range from 0V to the desired level of the control pedestal $V_{CPED}$ and the LED running light module 500, 600, 724 shown in FIGS. 5-7, according to specific example embodiments of this disclosure. A microcontroller 1360 may control a switched-mode power supply (SMPS) 1362 to generate a DC ramp voltage to sequence on the LED block cells 500 with or without edge-to-edge timing control. The microcontroller 1360 may also provide current control through the LEDs 402, and status and fault detection thereof. The output voltage may also be controlled by adjusting/modulating the reference of either an error amplifier of an analog feedback loop or programming desired values into a digital compensator of a switched-mode power supply, e.g., via program software.

Figure 14:
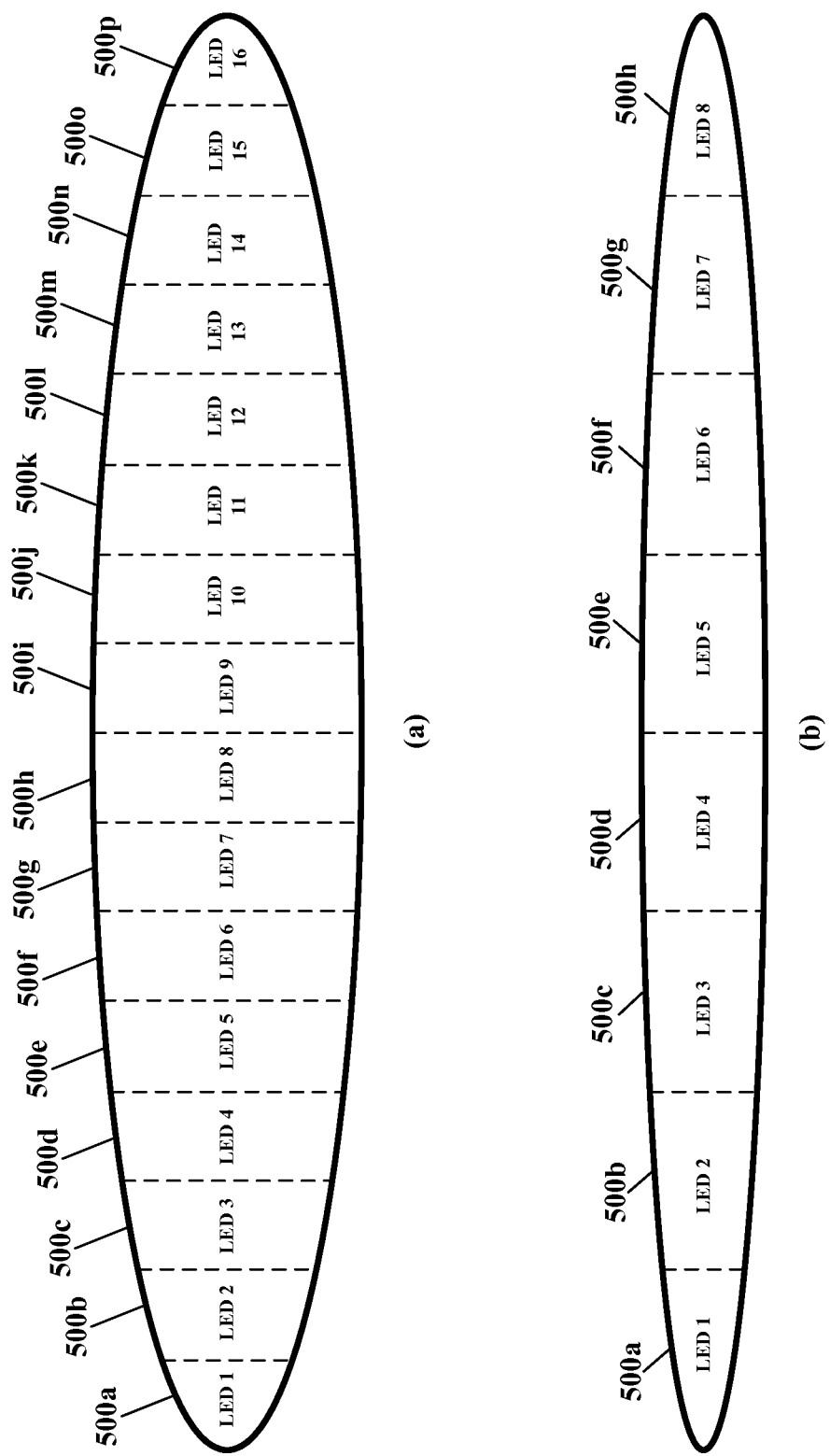
FIG. 14 illustrates schematic elevational views of LED running signal lights, according to a specific example embodiment of this disclosure.

Referring to FIG. 14, depicted is a schematic elevational view of a LED running signal light, according to a specific example embodiment of this disclosure. FIG. 14 shows a possible housing shape and placement therein of a plurality of LED block cells 500. Sequential turn on of the LEDs may be from left to right, or right to left while still supporting constant on operating modes which could be operated in PWM dimming mode. The LED block cells 500 may be mounted on a stiff or flexible printed circuit board (not shown) along with the other electronic components shown in FIGS. 5-7, or may be mounted on separated but serially interconnected printed circuit boards. Besides the sequential sweep across the LED block cells 500, the total emitted brightness may also be adjusted by increasing or decreasing the forward current of the LEDs 402. In specific applications such as automotive rear lights, multiple light functions can be merged by combining sweep control and variable forward currents, e.g., combination of rear lamp (low current, static on), break lights (high current, static on) and turn signal (medium current, sweep). Alternatively the brightness adjustment between break lights and rear lights can be performed by applying PWM dimming while the circuit is operated at maximum input voltage.

Referring to FIG. 15, depicted is a schematic elevational view of a LED running signal light, according to another specific example embodiment of this disclosure. FIG. 15 shows a possible housing shape and placement therein of a plurality of LED block cells 500. The LEDs may be behind an optical diffusion lens 1580 that integrates the increasing intensity light appearance of the LEDs turning on into one visual image. The LED block cells 500 may be mounted on a printed circuit board (not shown) along with the other electronic components shown in FIGS. 5-7.

The invention claimed is:

1. A light emitting diode (LED) running light, comprising:
a plurality of series coupled LED block cells;
each of the plurality of the LED block cells comprising at least one LED; and
a bypass circuit comprising a switch independently connecting a cathode of the at least one LED with an input terminal of a current sink, wherein the bypass circuit decouples the cathode of the LED from the current sink when a voltage at an anode of the LED is greater than a certain voltage value,
wherein each bypass circuit comprises:
a first transistor forming said switch and being coupled between the cathode of the LED and the current sink;
a zener diode coupled between the anode of the LED and one end of a first resistor having another end thereof coupled to a power supply common; and
a second transistor having an input coupled to a junction of the zener diode and the first resistor, and an output coupled to an input of the first transistor, wherein a voltage across the first resistor turns on the second transistor which then turns off the first transistor, thereby decoupling the cathode of the LED from the current sink.

2. The LED running light according to claim 1, wherein an anode of a first LED is connected to a voltage source and a cathode of a last LED of the plurality of series coupled LED block cells is connected to the current sink.

3. The LED running light according to claim 1, wherein the current sink is an adjustable current sink having a voltage reference input to determine a sink current.

4. The LED running light according to claim 1, wherein the certain voltage value is determined by a zener diode breakdown voltage.

5. The LED running light according to claim 1, further comprising a binning circuit configured to provide a value for the current sink to produce a certain total brightness of the LEDs in each of the plurality of LED block cells.

6. The LED running light according to claim 1, wherein the first and second transistors are selected from the group consisting of bipolar junction transistor (BJT) and field effect transistor (FET).

7. The LED running light according to claim 1, wherein the current sink is a constant current sink.

8. The LED running light according to claim 1, further comprising a controllable output voltage source having an output voltage coupled to the plurality of series coupled LED block cells.

9. The LED running light according to claim 8, wherein the output voltage from the controllable output voltage source is adjusted by varying a reference voltage to an error amplifier of an analog feedback loop in the controllable output voltage source.

10. The LED running light according to claim 1, wherein the current sink comprises a transistor, wherein a reference voltage controls current through the transistor.

11. The LED running light according to claim 10, wherein the transistor is selected from the group consisting of a bipolar junction transistor (BJT) and a field effect transistor (FET).

12. A vehicle comprising at least two LED block cells according to claim 1, wherein the LED running light provides a turn signal indicator.

13. The vehicle according to claim 12, wherein the turn signal indicator comprises a plurality of linearly arranged LED light bars.

14. The vehicle according to claim 12, wherein the turn signal indicator comprises a plurality of LEDs behind an optical diffusion lens.

15. A light emitting diode (LED) running light, comprising:
a plurality of series coupled LED block cells;
each of the plurality of the LED block cells comprising at least one LED; and
a bypass circuit comprising a switch independently connecting a cathode of the at least one LED with an input terminal of a current sink, wherein the bypass circuit decouples the cathode of the LED from the current sink when a voltage at an anode of the LED is greater than a certain voltage value,
and
a binning circuit configured to provide a value for the current sink to produce a certain total brightness of the LEDs in each of the plurality of LED block cells.

16. A light emitting diode (LED) running light, comprising:
a plurality of series coupled LED block cells;
each of the plurality of the LED block cells comprising at least one LED; and a bypass circuit comprising a switch independently connecting a cathode of the at least one LED with an input terminal of a current sink, wherein the bypass circuit decouples the cathode of the LED from the current sink when a voltage at an anode of the LED is greater than a certain voltage value, and a controllable output voltage source having an output voltage coupled to the plurality of series coupled LED block cells, wherein the output voltage from the controllable output voltage source is adjusted by programming desired values into a digital compensator of a switched-mode power supply used for the controllable output voltage source.

17. A light emitting diode (LED) running light, comprising:

a plurality of series coupled LED block cells;

each of the plurality of the LED block cells comprising at least one LED; and a bypass circuit comprising a switch independently connecting a cathode of the at least one LED with an input terminal of a current sink, wherein the bypass circuit decouples the cathode of the LED from the current sink when a voltage at an anode of the LED is greater than a certain voltage value, and a controllable output voltage source having an output voltage coupled to the plurality of series coupled LED block cells, further comprising:

a microcontroller coupled to the current sink and the controllable output voltage source, wherein the microcontroller controls the output voltage from the controllable output voltage source, provides the voltage reference input to the current sink, and measures LED current from the current sink.

18. The LED running light according to claim 17, wherein the current sink comprises a transistor, wherein a reference voltage controls current through the transistor.

19. The LED running light according to claim 18, wherein the transistor is selected from the group consisting of a bipolar junction transistor (BJT) and a field effect transistor (FET).

20. A vehicle comprising at least two LED block cells according to claim 17, wherein the LED running light provides a turn signal indicator.

21. The vehicle according to claim 20, wherein the turn signal indicator comprises a plurality of linearly arranged LED light bars.

22. The vehicle according to claim 20, wherein the turn signal indicator comprises a plurality of LEDs behind an optical diffusion lens.

23. A method for sequentially controlling a light emitting diode (LED) running light, said method comprising the steps of:

coupling a plurality of LED block cells in series, wherein each LED block cell comprises at least one LED arranged between a first and a second node and wherein each second node is independently connected with a current sink through a switch wherein the switch is closed when a voltage at a first node of an associated LED block cell is less than a certain respective voltage value;

applying an adjustable voltage to a first node of a first one of the plurality of LED block cells;

decoupling second nodes of respective LED block cells from the current sink when a voltage at an input of the respective LED block cell is above the certain respective voltage values, detecting negative transitioning edges of a waveform from the current sink connected to the plurality of LED block cells; and using the detected negative transitioning edges for an interval trigger of a timing control loop.

* * * * *